June 8, 1965
F. L. HILL ETAL
3,187,872
TOMATO HARVESTER
Filed Feb. 18, 1963
2 Sheets-Sheet 1
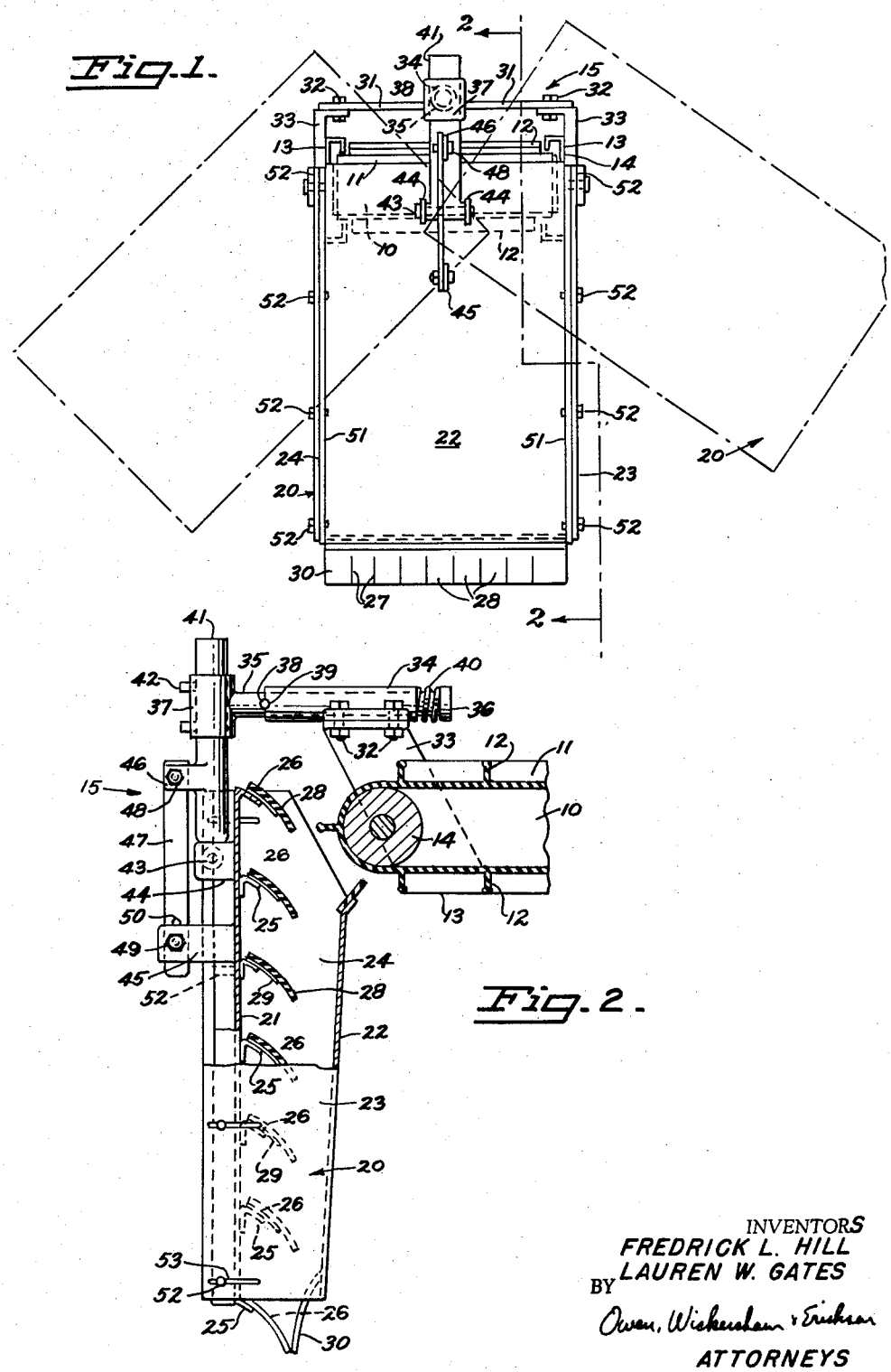
INVENTORS
FREDRICK L. HILL
LAUREN W. GATES
BY
ATTORNEYS June 8, 1965  F. L. HILL ETAL  3,187,872
TOMATO HARVESTER Filed Feb. 18, 1963  2 Sheets-Sheet 2

INVENTORS
FREDRICK L. HILL
LAUREN W. GATES
BY
ATTORNEYS

United States Patent Office 3,187,872
Patented June 8, 1965

3,187,872
TOMATO HARVESTER
Frederick L. Hill, Rio Vista, and Lauren W. Gates, Solano County, Calif., assignors to the Regents of The University of California, Berkeley, Calif.
Filed Feb. 18, 1963, Ser. No. 259,115
7 Claims. (Cl. 193—7)

This invention relates to an improved fruit-depositing device for use with tomato harvesters and similar harvesting devices. This application is a continuation-in-part of patent application Serial No. 148,963, filed October 31, 1961.

The usefulness of the present invention is not limited to tomato harvesting, but that use will serve as an illustrative example. In the machine harvesting of tomatoes, according to the parent application (a) a cutting device cuts the vine's main stem preferably at root level; (b) a pickup device gently elevates the vine to a shaking device; (c) at the shaking device, rubber-covered walking bars mounted in two contrary-moving sets agitate the vine and advance it along the bars, while providing a gradually increasing shaking force as the vine moves from one end of the shaker to the other; (d) the vine is carried to the end of the shaking device and falls to the ground through an open chute; (e) the tomatoes removed by the shaker fall directly onto a conveyor, which carries them rearwardly; (f) certain devices remove dirt, leaves, and trash from the harvested tomatoes; (g) the tomatoes are cross-conveyed to sorting belts; (h) the tomatoes are visually sorted by hand as the sorting belts move them; (i) the sorted tomatoes are conveyed into containers, preferably located on a trailer being pulled parallel to the harvester; and (j) the containers of tomatoes are then hauled away by trucks.

The present invention is used in step (i) as a discharge chute or fruit depositing device for receiving fruit from the conveyor and depositing it in containers. It may, of course, be used in other environments for a similar purpose.

The main problem is to lower the fruit gently into the bins or other containers without damaging the fruit, yet at great flow velocity, for hundreds of tomatoes are being fed there each minute.

Different fruits require different operation. Even with the same kind of fruit, the average diameter varies widely from one crop to another. Hence, an object of the invention is to provide means for controlling the lowering speed to a suitable value for each crop.

Another problem is to obtain the proper trajectory of the fruit from the conveyor into the chute, and this requires a set of adjustments. Another object of this invention is, therefore, to provide means for adjusting the device to obtain the proper trajectory.

A further problem is to accommodate the fruit to the movement of the container and of the conveyor and the relative movement between them, and so an object of the invention is to provide this accommodation.

Other objects and advantages of the invention will appear from the following description of a preferred form of the invention.

In the drawings:

FIG. 1 is a view in front elevation of a fruit-depositing device embodying the principles of the invention, installed on the end of an output conveyor. Broken lines show rather extreme alternative positions of the device, portions being broken away to conserve space.

FIG. 2 is a view in section taken along the line 2—2 in FIG. 1, showing a small portion of the output conveyor.

Figure 3:
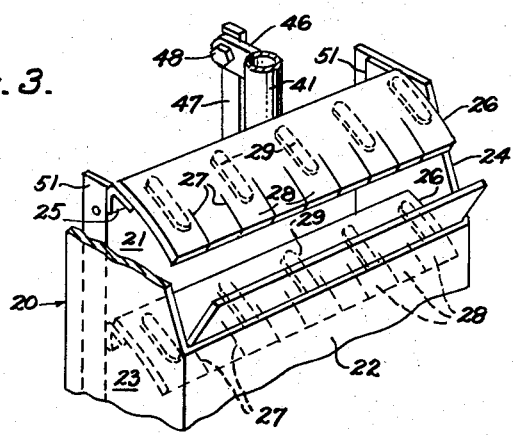
FIG. 3 is a fragmentary perspective view of a portion of the device of FIGS. 1 and 2, with portions broken away and shown in section.

An output conveyor 10 usually extends out to one side of the fruit (e.g., tomato) harvesting machine (not shown) being supported for adjustment in the height of its outboard end. The conveyor 10 may for example comprise a flighted belt 11 with cross members or flights 12 that enable upward movement of the tomatoes. The belt 11, shown supported by a frame 13, may be driven by a roller (not shown) at the inboard end of its loop, and there is an idling roller 14 at its outboard end. As the belt 11 moves around the roller 14, the tomatoes drop off the belt 11 into the fruit depositing device 15 forming the subject matter of the present invention. Since there is momentum, they drop off in a trajectory rather than simply falling vertically.

Figure 4:
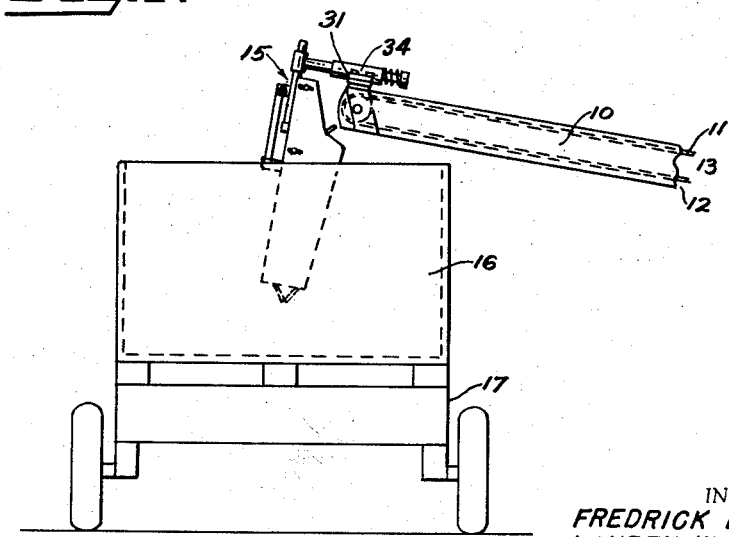
FIG. 4 is a fragmentary view in end elevation showing the device in use at the end of the delivery conveyor of a harvesting device for discharging the harvested fruit into a truck, the delivery conveyor being broken off and the harvester itself not shown.

The purpose of the fruit depositing device 15 is to gently place the tomatoes into a bin 16 (FIG. 4) that is moved on a wheeled frame 17 alongside the harvester, usually by a separate powered vehicle (not shown), and to do this with minimum damage to the tomatoes or other fruit being harvested.

The device 15 has a housing 20 with an outboard wall 21 and an inboard wall 22 joined by walls 23 and 24. All four walls terminate together at their lower ends, but the upper end of the outboard wall 21 lies about that of the inboard wall 22; for the top of the wall 21 lies nearly level with the upper run of the belt 11, while the top of the wall 22 lies below the lower run of the belt 11.

A series of horizontal brackets 25 is welded or otherwise secured to the outboard wall 21 at spaced intervals, and each braket 25 supports a strip 26 of belting that extends toward the wall 22, but on a downward slant, as provided by the bracket 25 and as shown in FIG. 2. Each belt strip 26 has a plurality of slits 27 extending parallel to the walls 23 and 24 from the edge facing the inboard wall 22, to provide a series of flaps 28. Beneath alternate flaps 28 are slender leaf springs 29 to provide a gentle upward pressure to keep urging the strip 26 back to their original positions. The flaps are sufficiently flexible so that as the tomatoes roll against them as they move down the inclined wall 22 which converges toward the wall 21, the flaps 28 yield downwardly to let the tomatoes move down below them; however, the flaps 28 at this time reduce the downward velocity of the tomatoes. Therefore, the tomato does not gain in acceleration during its passage through the device 15, being slowed down to nearly zero speed at each strip 26, the final fall from the bottom strip 26 starting at nearly zero speed. Opposite the bottom strip 26 is a similar strip 30 having its own slits 27, flaps 28, and springs 29, and the tomatoes drop out gently from between the strips 26 and 30 into the bin 16.

The housing 20 is supported by the frame 13 of the conveyor 10. For this purpose, a pair of arms 31 are bolted by bolts 32 to slotted openings in a pair of plates 33 that are secured to the frame 13 and extend up therefrom so as to adjustable lengthwise of the conveyor 10, so as to enable lengthwise adjustment to accommodate the trajectory of the tomatoes as they fall from the conveyor 10 into the devices 15. The two arms 31 are joined by a tube 34 that lies above the belt 11, generally parallel to its axis. A rod 35 extends through the tube 34 and has an enlarged end 36 adjacent the inboard end of the tube 34 and a sleeve 37 that extends vertically from the rod's opposite end. The rod 35 can rotate in the tube 34 but is constrained against rotation by a pin 38 on the rod 35 that ordinarily lies in a recess 39 in one end of the tube 34, being urged there by a spring 40 which is compressed between the other end of the tube 34 and the rod's enlarged end 36.

A tubular post 41 extends vertically through the sleeve 37, its relative vertical position being adjustable and retained by set screws 42. The lower end of the post 41 is pivotally connected to the housing 20 by a pivot pin 43 on the post 41 journaled in a pair of ears 44 that are welded to the outside of the wall 21. Another ear 45 is welded to the wall 21 below the ears 44. Above the ear 45 there is a bracket 46 on the post 41, and a rigid link 47 is joined to the bracket 46 by a pivot bolt 48 and to the ear 45 by a bolt 49, which extends through a vertical slot 50 in the link 47. Thus, the housing 20 is supported by the tubular post 41 and is adjustable with respect to a small angle of inclination by rotation about the pivots 43 and 46 and relative movement between the bolt 49 and the vertical slot 50. This adjustment regulates the verticality of the housing 20 with respect to a vertical plane parallel to the longitudinal axis of the machine, and enables compensation with respect to the upward inclination of the outboard boom conveyor 10.

The rotatability of the rod 35 in the tube 34 is a safety device. Normally, the spring 40, pin 38, and recess 39 urge the housing 20 to the vertical position shown in FIG. 1, but if the bin 16 is moving faster or slower than the harvester, its forward or rear wall may come against the housing 20, and then the housing 20 is swung forwardly or rearwardly against the pressure of the spring 40, as indicated by broken lines in FIG. 1.

The vertical adjustment of the post 41 in the sleeve 37 enables adjustment of the inlet to the housing 20 relative to the belt 11.

There is one further adjustment. The wall 21 has flanges 51 to which the walls 23 and 24 are secured by bolts 52 that extend through horizontal slots 53 in the walls 23 and 24. Thereby, the distance between the walls 21 and 22 can be adjusted to compensate for average fruit size, this of course also adjusting the distance between the wall 22 and the flaps 28.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. A fruit depositing device, including in combination a box-like device having an inboard generally vertical wall, an outboard generally vertical wall facing said inboard wall, and generally vertical side walls, connecting said inboard and outboard walls; and
a series of fruit-delaying means secured to said outboard wall only and comprising
a series of resiliently anchored flexible strips extending out toward said inboard wall and downwardly and terminating in a free edge closer to the inboard wall than the diameter of the fruit, with slits extending from said free edge toward said outboard wall so that the fruit slides down said inboard wall, its velocity being reduced by engagement with said series of fruit-delaying means.

2. The device of claim 1 wherein said inboard wall slants toward the lower end of said outboard wall.

3. The device of claim 2 wherein said outboard wall extends above said inboard wall to provide a lateral inlet.

4. A fruit depositing device, including in combination:
a housing having generally vertical walls, namely an inboard wall, an outboard wall facing said inboard wall, side walls joining said inboard and outboard walls, and
a series of fruit-delaying means secured to said outboard wall only and comprising a series of lateral brackets extending across said outboard wall,
a strip of belting fabric supported by each said bracket and extending out toward said inboard wall and downwardly and terminating in a free edge closer to said inboard wall than the diameter of said fruit, with slits extending from said free edge toward said brackets, and
spring means supported by said brackets for yieldably supporting each said strip.

5. A fruit depositing device, including in combination:
a generally vertical outboard wall;
a generally vertical inboard wall facing and generally parallel to said outboard wall but slanting so as to lie closer thereto at its lower end than at its upper end, said outboard wall extending above said inboard wall to provide an inlet;
generally vertical side walls joining said inboard and outboard walls;
a series of fruit-delaying means secured to said outboard wall only and comprising
a series of lateral brackets extending across said outboard wall,
a strip of belting fabric supported by each said bracket and extending out toward said inboard wall and downwardly and terminating in a free edge closer to the inboard wall than the diameter of the fruit with slits extending from said free edge toward said brackets, and
spring means supported by said brackets for yieldably supporting each said strip;
a support member secured to said outboard wall and extending upwardly therefrom;
means providing rotational adjustment of said outboard wall relative to said support member;
means supporting said support member for vertical adjustment thereof; and
means enabling swinging movement of said walls relative to said supporting means in response to a force applied to said side walls.

6. A fruit depositing device, including in combination:
a generally vertical outboard wall;
a generally vertical inboard wall facing and generally parallel to said outboard wall but slanting toward said outboard wall at the lower end, said outboard wall extending above said inboard wall to provide an inlet,
a series of fruit-delaying means secured to said outboard wall only and comprising
a series of lateral brackets extending across said outboard wall,
a strip of belting fabric supported by each said bracket and extending out toward said inboard wall and downwardly and terminating in a free edge closer to the inboard wall than the diameter of the fruit with slits extending from said free edge toward said brackets, and
spring means supported by said brackets for yieldably supporting each said strip,
generally vertical side walls fixedly secured to one of said inboard and outboard walls and adjustably secured to the other, to provide a housing of adjustable width,
a support member secured to said housing and extending upwardly therefrom;
means providing rotational adjustment of said housing to said support member,
a collar supporting said support member and providing for vertical adjustment thereof,
a rod extending generally perpendicular to said support member from said collar;
a tube through which said rod extends,
spring means compressed between the end of said tube on the opposite side from said collar and the adjacent end of said rod, and, a locking pin on said rod, a recess for said pin being provided in said tube, to enable swinging movement against the pressure of said spring.

7. A fruit depositing device, including in combination:

a housing having generally vertical walls, namely an inboard wall, an outboard wall facing said inboard wall, side walls joining said inboard and outboard walls, and a series of fruit-delaying means secured to said outboard wall only and comprising a series of lateral brackets extending across said outboard wall, a strip of belting fabric supported by each said bracket and extending out toward said inboard wall and downwardly and terminating in a free edge closer to the inboard wall than the diameter of the fruit with slits extending from said free edge toward said brackets, spring means supported by said bracket for yieldably upporting each said strip, a support member secured to said housing and extending upwardly therefrom, horizontal means supporting said support member, and means enabling swinging movement of said housing relative to said horizontal support means in response to a force applied to said side walls.

References Cited by the Examiner

UNITED STATES PATENTS

| | | | |
|---|---|---|---|
| 366,721 | 7/86 | Graves | 193—32 |
| 670,222 | 3/01 | Campbell | 193—32 |

SAMUEL F. COLEMAN, *Primary Examiner.*

ANDRES H. NIELSEN, *Examiner.*

UNITED STATES PATENT OFFICE
CERTIFICATE OF CORRECTION

Patent No. 3,187,872                      June 8, 1965

Fredrick L. Hill et al.

It is hereby certified that error appears in the above numbered patent requiring correction and that the said Letters Patent should read as corrected below.

In the grant, lines 1 to 3, for "Frederick L. Hill, of Rio Vista, and Lauren W. Gates, of Solano County, California, assignors to the Regents of The University of California of Berkeley, California," read -- Fredrick L. Hill, of Rio Vista, and Lauren W. Gates of Solano County, California, assignors to The Regents of The University of California, of Berkeley, California, --; line 12, for "Regents of The University of California, its successors" read -- The Regents of The University of California, its successors --; in the heading to the printed specification, lines 3 to 5, for "Frederick L. Hill, Rio Vista, and Lauren W. Gates, Solano County, Calif., assignors to the Regents of The University of California, Berkeley, Calif." read -- Fredrick L. Hill, Rio Vista, and Lauren W. Gates, Solano County, Calif., assignors to The Regents of The University of California, Berkeley, Calif. --; column 2, line 31, for "about" read -- above --; line 44, for "strip" read -- strips --; line 45, for "flaps" read -- flaps 28 --; line 62, for "to adjustable" read -- to be adjustable --; line 65, for "devices" read -- device --; column 6, line 1, for "bracket" read -- brackets --; line 2, for "upporting" read -- supporting --.

Signed and sealed this 15th day of March 1966.

(SEAL)
Attest:

ERNEST W. SWIDER                      EDWARD J. BRENNER
Attesting Officer                     Commissioner of Patents